United States Patent Office 3,453,259
Patented July 1, 1969

3,453,259
CYCLODEXTRIN POLYOL ETHERS AND THEIR OXIDATION PRODUCTS
Stanley M. Parmerter, Wheaton, Earle E. Allen, Jr., Chicago, and David H. Le Roy, North Riverside, Ill., assignors to Corn Products Company, New York, N.Y., a corporation of Delaware
No Drawing. Filed Mar. 22, 1967, Ser. No. 624,978
Int. Cl. C08b *19/00;* C13l *1/10*
U.S. Cl. 260—209          9 Claims

ABSTRACT OF THE DISCLOSURE

New alkyl ethers of cyclodextrin which may be a polyol substituted alkyl ether of the formula

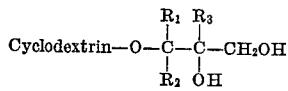

and a carbonyl substituted alkyl ether of cyclodextrin of the formula

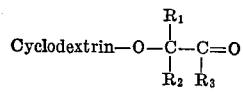

Methods for preparing the novel products are disclosed wherein a cyclodextrin is reacted with a 2,3 epoxy alcohol or a halohydrin to obtain the polyol substituted ethers; and oxidizing said polyol alkyl ether products to obtain the corresponding carbonyl substituted alkyl ether products. The products of the invention may be used as complexing agents or to form inclusion compounds and complexes with various chemicals and materials in ways which are similar to those which are known relative to the cyclodextrins. For example, inclusion compounds may be formed with flavoring agents and the like.

---

The invention relates to oxygen containing ethers of cyclodextrin, in particular, polyol substituted ethers and carbonyl substituted ethers of cyclodextrin. The invention also relates to methods of making such new oxygen containing ethers of cyclodextrin.

The cyclodextrins are a group of homologous oligosaccharides that are obtained from scratch by the action of enzymes elaborated by *Bacillus macerans*. The cyclodextrins are known as Schardinger dextrins from an early investigator who studied these materials. They are homologous cyclic molecules containing 6 or more α-D-glucopyranose units linked together at the 1,4 postions as in amylose. The cyclic molecule may also be referred to as a torus. As a consequence of the cyclic arrangement, this torus is characterized by having neither a reducing end group nor a non-reducing end group. The torus molecule is depicted in the following schematic formula, where the hydroxyl groups are shown in the 2, 3 and 6 positions in the illustrated anhydroglucose units. The letter $n$ may be a number from 4 to 6, or higher.

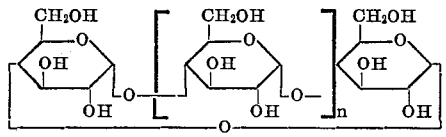

When $n$ is 4, the torus molecule is known as α-cyclodextrin or cyclohexaamylose, because the torus contains six anhydroglucose units; when $n$ is 5, the seven unit member is known as β-cyclodextrin or cycloheptaamylose; and when $n$ is 6, the eight unit member is known as γ-cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglucosylase (*B. macerans amylase*). The source of the enzyme is usually a culture of *Bacillus macerans* which is grown under conventional conditions on conventional media containing sources of nitrogen, carbon, growth factors and minerals. The cyclodextrin transglucosylase may be produced by following published teachings such as, for example, those described by D. French in Methods in Enzymology, S. P. Colowick and N. O. Kaplan, editors, Academic Press, New York, N.Y., vol. V, 1962, pp. 148–155.

The cyclodextrin transglucosylase activity in cultures of *Bacillus macerans* may be measured by the Tilden-Hudson procedure as described by these two workers in J. Bacteriol, 43, 527–544 (1942). In general, the cyclodextrin transglucosylase is added to a dilute solution of a gelatinized starch, whereupon a conversion to cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma, may be fractionated by procedures such as those described by D. French et al., J. Am. Chem. Soc., 71, 353 (1949).

The various homologous cyclodextrins, having from six to eight units, or higher, and their mixtures, may be used as equivalent materials for the purposes of this invention. In practice, these mixtures may be used as equivalent material for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

Cyclodextrin is known as a clathrating compound, that is, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Cyclodextrin has established utility, and is the subject of study for further applications. It is understandably desirable to provide novel cyclodextrin structures to be used as inclusion compounds, and for other purposes.

One primary object of this invention is to provide new cyclodextrin products which are ether derivatives of cyclodextrin, wherein a portion is hydroxy or carbonyl substituted. It is a closely related object of this invention to also provide new and practical methods for making such new compounds.

It is another object of this invention to provide new cyclodextrin products which can find useful application in the field of clathration in ways similar to those demonstrated for cyclodextrin as such.

A still further object of this invention is to provide new cyclodextrin products which find useful application as intermediates for making other useful chemicals.

Still another object of this invention is to provide a practical method for making novel cyclodextrin comounds, particularly a relatively simple and economical process which makes it more attractive to use such compounds in various endeavors.

The foregoing objects are attained together with other objects which will occur to practitioners who consider the following disclosure.

The polyol substituted ethers of cyclodextrins of this invention may be represented by the following general Formula I

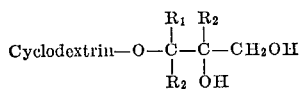

where $R_1$, $R_2$, and $R_3$ may all be the same or different, and may be hydrogen, alkyl, cycloalkyl, substituted alkyl, alkenyl or aryl.

The foregoing products are vic.-dihydroxyalkyl ethers of cyclodextrin, that is, the products contain a dihydroxy radical in which two hydroxyl groups are attached to vicinal or immediately adjacent carbons. This group may also be referred to herein as a vic.-glycol group or an acyclic vic.-glycol group. The group may be structurally designated as:

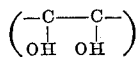

The polyol substituted ethers of general Formula I may also be referred to as glycerol ethers of cyclodextrin because the reacted hydroxy portion of the cyclodextrin moiety may be considered as comprising a third hydroxy group in the reacted product which would correspond to a substituted glycerol.

The polyol substituted ethers of general Formula I, that is, the vic.-glycol group may be oxidized by an agent which is capable of dehydrogenating and cleaving said group to provide the carbonyl substituted alkyl ethers of the following general Formula II:

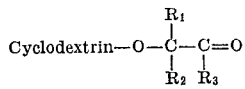

where $R_1$, $R_2$ and $R_3$ are the same as in general Formula I. In general Formula II, the product is an aldehyde when $R_3$ is hydrogen, and the product is a ketone when $R_3$ is any of the other alternative substitutions. One preferred ketone is represented when $R_1$ and $R_2$ are hydrogen and $R_3$ is a group of the type enumerated other than hydrogen.

As is known, the anhydroglucose unit may have different degrees of substitution (D.S.) from one to three. In a given quantity of a cyclodextrin derivative, there will generally be some cyclodextrin molecules that are not substituted at all (D.S., 0), together with other molecules that have different degrees of substitution, from 1 to 3. A statistical average is employed to characterize the average D.S. of the entire quantity, although the figure is ordinarily stated as the D.S. rather than the average D.S. The oxygen substituted ethers of cyclodextrin prepared according to this invention may have a varying range of D.S. which may be as little as 0.0001, up to the maximum level of three. Irrespective of the number of molecules of cyclodextrin which are reacted, or the actual sequence of substitution, or the number of anhydroglucose units involved, the general formula is intended to represent products where the substitution may occur to various degrees of substitution at all or less than all anhydroglucose units in all or less than all cyclodextrin molecules. This may be expressed herein in various ways, for example, by referring to an average D.S., a varying D.S. per average anhydroglucose unit, or an average D.S. per anhydroglucose unit. All such terms will include the foregoing concepts.

The polyol substituted ethers of this invention are prepared by reacting a cyclodextrin with a 2,3 epoxy alcohol reactant of the formula

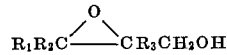

where $R_1$, $R_2$ and $R_3$ are the same as designated in foregoing general Formula I.

The polyol ethers may also be prepared by reacting a cyclodextrin with a halohydrin of the formula

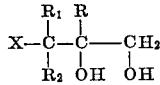

where $R_1$, $R_2$ and $R_3$ have the same values as previously assigned, and where X is a halogen.

The polyol substituted ether products are prepared generally by reacting a cyclodextrin in an alkaline medium with, for example, a 2,3 epoxy alcohol. The reaction is preferably conducted at temperatures above room temperature. The product may be separated by treating the reaction mixture with an organic solvent in which the product is insoluble, and such solvent may be methanol, acetone, and others.

Among representative epoxy alcohols which may be used for the reaction with the cyclodextrin are glycidol (where all the R's are hydrogen in general Formula I), 2,3-epoxy-1, 4-butanediol, 2,3-epoxy-2-methylpropanol, and the like. A representative halohydrin is glycerol alpha-monochlorohydrin. The following Equations 1 and 2 illustrate the reaction of a cyclodextrin with, respectively, glycidol and glycerol alpha-monochlorohydrin to form the 2,3-dihydroxypropyl ether of cyclodextrin:

(1) 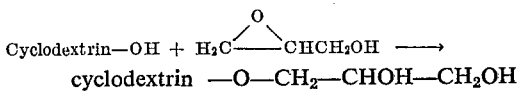
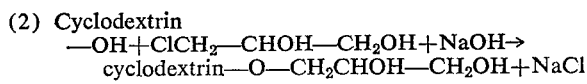

(2) Cyclodextrin
—OH+ClCH$_2$—CHOH—CH$_2$OH+NaOH→
cyclodextrin—O—CH$_2$CHOH—CH$_2$OH+NaCl The epoxy butanediol may be used to make the 1-hydroxymethyl 2,3-dihydroxypropyl ether of cyclodextrin.

One preferred class of products are polyol substituted alkyl ethers of cyclodextrin represented by the formula:

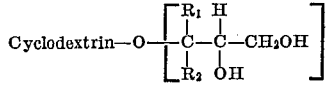

where $R_1$ and $R_2$ represent alkyl radicals and particularly lower alkyl radicals as methyl, ethyl, n-propyl, i-propyl, n-butyl, i-butyl, and t-butyl. Preferably, the alkyl radicals contain 1–4 carbon atoms.

Correspondingly, aldehydes derivated by oxidizing the above, such as by using periodic acid have the formula:

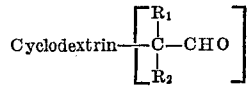

where $R_1$ and $R_2$ are both alkyl radicals of the type just enumerated.

The glycerol ether prepared in the foregoing Equations 1 and 2 may be then reacted with an oxidizing agent such as sodium periodate as indicated in following Equation 3 to form the glycolaldehyde ether of cyclodextrin:

(3) Cyclodextrin
—O—CH$_2$—CHOH—CH$_2$OH+NaIO$_4$→cyclodextrin
—O—CH$_2$—CHO+HCHO+NaIO$_3$+H$_2$O Among useful oxidizing agents are the compounds which yield periodate ions in solution, such as periodic acid, alkali metal meta periodates, or the like; lead tetraacetate, iodosobenzene, and others. For general use, the oxidizing agent may be used in a molar ratio to the vic.-glycol group of from about 0.8 to about 1. In general, molar ratios below 0.8 result in a fewer number of vic.- glycol groups of the polyol ether participating in the reaction. Ratios above about 1 may result in undesirable by-products.

It is preferred to conduct the oxidation step at temperatures below that of room temperature, preferably at temperatures close to 0° C. At such low temperatures there is less likelihood of oxidizing the carbon to carbon bond of the anhydroglucose unit in the cyclodextrin.

The following examples are presented to teach various embodiments of practicing the invention, but it should be understood that such examples are intended to be only illustrations and should not be construed as exclusive teachings.

EXAMPLE I

Glycerol ether of cyclodextrin

A slurry is prepared of 100 ml. of 10% sodium hydroxide and 227 grams of β-cyclodextrin, and to the slurry is added 26 g. of glycidol. The slurried mixture is stirred at 50° C. for 16 hours and then the pH is adjusted to 7.0 with concentrated hydrochloric acid. The mixture is then poured into two liters of methanol accompanied by vigorous stirring. The solid product is separated and washed with methanol. A second crop of the product is obtained by diluting the filtrate with acetone. The combined solids are washed thoroughly with methanol in an operating blender and then dried. Analysis indicates 0.91 meq. α-glycol per gram or a D.S. of 0.15. The product is highly water soluble and melts at 290°–300° C. with decomposition.

EXAMPLE II

Cyclodextrin trihydroxybutyl ether

A solution is prepared of 36.4 grams of 2,3-epoxy-1,4-butanediol in 200 ml. of water, and to this solution is added 56.7 g. of β-cyclodextrin. The mixture is chilled to 0° C. and 22 g. of solid sodium hydroxide is added with stirring. The solution is stirred at 50° for 16 hours before the pH is adjusted to 6.5 with concentrated hydrochloric acid. Acetone is added, whereupon the product is precipitated. The product is separated by decantation and washed with 2 liters of boiling methanol followed by 3 liters of cold methanol. The yield of white powder is 27.0 g. after drying in a vacuum oven. The product contains 1.4 meq. of α-glycol per g. which corresponds to a D.S. of 0.27. The product is very water soluble. It does not melt below 300° C. but begins to brown at 295° C.

EXAMPLE III

Oxidation of cyclodextrin glycerol ether

A slurry is prepared of 63.8 g. of the glycerol ether prepared according to the process of Example I in 50 ml. of water. The slurry is chilled to 0° C., and then 221 ml. of 4.06% $NaIO_4$ in water solution is added slowly with stirring. The mixture is then stirred at 0°–5° C. for 16 hours. The product is precipitated by the addition of acetone, washed with two 500-ml. portions of 90% methanol and dried at 70° C. The product contains 0.53 meq. of α-glycol per g. The loss of 0.38 meq./g. indicates that oxidation has occurred on the substituent group. The product gives a positive carbonyl test with hydroxylamine reagent.

The torus molecule of the cyclodextrin alkyl ethers of this invention encourages the use of these products as inclusion compounds. It will be appreciated that many of the products of this invention may be used as complexing agents or to form inclusion compounds and complexes with various chemicals in ways which are similar to those which are known relatives to the cyclodextrins. For example, inclusion compounds may be formed with flavoring agents and the like. In particular, the glycerol ethers of cyclodextrin complex with boric acid which leads to various applications of interest in the art, such as sizing of paper. Diesters of the glycerol ethers and fatty acids may be employed as emulsifiers in applications, such as that taught in U.S. 3,199,988. The glycerol ethers also undergo selective oxidation because of the vicinyl alcohol groups and they are known to be adapted towards other special chemical reactions characteristic of such vicinyl alcohol groups. The oxidation products are particularly of interest because they lead to the carbonyl reactive group in the alkyl ethers of cyclodextrin, and such carbonyl group may take the form either of a ketone or aldehyde.

The glycerol ethers are polyols and are therefore useful for the formation of polyurethane foams. A preferred practice would provide admixing the glycerol ethers of this invention with other liquid polyols, and then reacting with a selected isocyanate or a polyisocyanate under the usual reaction conditions.

The aldehyde forms of the invention may be used as cross-linking agents by combining the aldehydes with, for example, starch propionamide. The resulting cross-linked materials in general show a reduced water solubility. The aldehydes may also be considered for use as wet and dry strength agents in the paper art. The customary procedures of this art may be followed by adding the aldehyde forms to the paper pulp or by applying the aldehydes to the surface of the paper to obtain wet and dry strength.

The increased water solubility of the glycerol ether forms of course extends the applicability of such cyclodextrin derivatives for utilizing the clathrating properties of the cyclodextrin portion of the derivatives. This may be particularly desirable when it is necessary to use more concentrated aqueous solutions of the cyclodextrins.

The invention may now be practiced in the various ways which will occur to practitioners, and all such practice is intended to comprise a part of this invention so long as it comes within the terms of the following claims as given further meaning by the language of the preceding specification.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. An oxygen containing ether of cyclodextrin of the class represented by the formula:

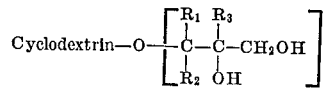

and the formula:

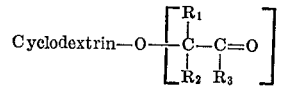

where $R_1$, $R_2$ and $R_3$ are of the class consisting of lower alkyl, cycloalkyl, lower substituted alkyl, monocyclic aryl, lower alkenyl and hydrogen.

2. An ether as in claim 1 wherein the product is a polyol alkyl substituted ether of cyclodextrin represented by the formula:

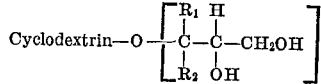

where $R_1$ and $R_2$ are alkyl radicals containing 1–4 carbon atoms.

3. An ether as in claim 1 wherein the product is an aldehyde alkyl substituted ether of cyclodextrin represented by the formula:

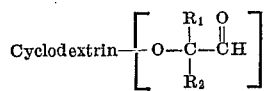

where $R_1$ and $R_2$ are alkyl radicals containing 1–4 carbon atoms.

4. An ether as in claim 1 wherein the product is a ketone substituted ether of cyclodextrin represented by the formula:

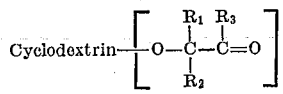

where $R_1$, $R_2$ and $R_3$ are of the class consisting of lower alkyl, cycloalkyl, lower substituted alkyl, monocyclic aryl, lower alkenyl and hydrogen.

5. An ether as in claim 1 wherein the product is a glycerol ether represented by the formula:

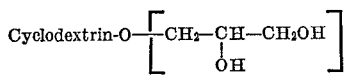

where the cyclodextrin moiety contains a plurality of at least 6 cyclic anhydroglucose units, and the expression in brackets represents various degrees of substitution of from substantially less than one up to the maximum of three per average anhydroglucose unit in the cyclodextrin.

6. An ether as in claim 1 wherein the product is an aldehyde ether represented by the formula:

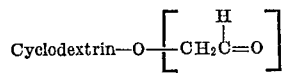

where the cyclodextrin moiety contains a plurality of at least 6 cyclic anhydroglucose units, and the expression in brackets represents various degrees of substitution of from substantially less than one up to the maximum of three per average anhydroglucose unit in the cyclodextrin.

7. An ether as in claim 1 wherein the product is a ketone ether represented by the formula:

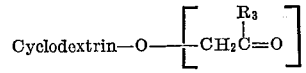

where $R_3$ is of the class consisting of lower alkyl, cycloalkyl, lower substituted alkyl, monocyclic aryl, lower alkenyl and hydrogen where the cyclodextrin moiety contains a plurality of at least 6 cyclic anhydroglucose units, and the expression in brackets represents various degrees of substitution of from substantially less than one up to the maximum of three per average anhydroglucose unit in the cyclodextrin.

8. An alkyl ether as in claim 1 which is the 1-hydroxymethyl-2,3-dihydroxypropyl ether of a cyclodextrin.

9. An alkyl ether as in claim 1 which is the 2-methyl-2,3-dihydroxypropyl ether of cyclodextrin.

References Cited

UNITED STATES PATENTS

| | | | |
|---|---|---|---|
| 2,976,274 | 3/1961 | McNeely et al. | 260—209 |
| 2,996,551 | 8/1961 | DeGroote et al. | 260—209 |
| 3,098,869 | 7/1963 | Borchert | 260—209 |
| 3,236,832 | 2/1966 | Opie et al. | 260—209 |
| 3,300,474 | 1/1967 | Flodin et al. | 260—209 |
| 3,378,541 | 4/1968 | Colquhoun et al. | 260—209 |

LEWIS GOTTS, *Primary Examiner.*

JOHNNIE R. BROWN, *Assistant Examiner.*

U.S. Cl. X.R.

260—25; 99—140; 117—156; 252—351; 162—175

PO-1050
(5/69)

UNITED STATES PATENT OFFICE
CERTIFICATE OF CORRECTION

Patent No. __3,453,259__                    Dated ____July 1, 1969____

Inventor(s) __Stanley M. Parmerter, Earle E. Allen, Jr. and D. H. LeRoy__

It is certified that error appears in the above-identified patent and that said Letters Patent are hereby corrected as shown below:

Column 1, line 48 "scratch" should read "starch";

Column 4, lines 9 thru 13 of formula

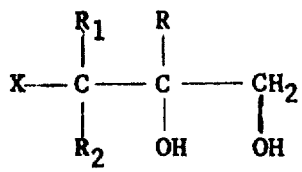

Should read

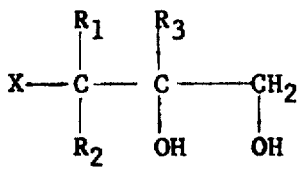

Column 5, line 70 "relatives" should read "relative".

SIGNED AND
SEALED
MAR 17 1970

(SEAL)
Attest:

Edward M. Fletcher, Jr.
Attesting Officer

WILLIAM E. SCHUYLER, JR.
Commissioner of Patents